Patented Apr. 16, 1946

2,398,361

UNITED STATES PATENT OFFICE 2,398,361

RESINOUS COMPOSITIONS

Rupert S. Daniels, Union, N. J., assignor to Bakelite Corporation, New York, N. Y., a corporation of New Jersey No Drawing. Application May 17, 1941, Serial No. 393,936

9 Claims. (Cl. 260—59)

This invention relates to the manufacture of improved resinous compositions and comprises more particularly phenol-aldehyde resins that are hardened or cured to the insoluble and infusible state by the addition of acids and acid salts.

There are existent processes for modifying the curing or hardening properties of phenol-aldehyde type resins which are dependent upon the addition of organic or inorganic acids, or their acid salts, to the resin after initial condensation has taken place; these acid addition compounds are technically described as hardening agents. In general the purpose of adding acids is to obtain phenol-aldehyde resinous compositions which due to the catalytic action of the acids cure to the insoluble and infusible state without the application of heat, although occasionally they are added to accelerate the curing of resins at elevated temperatures. Of the inorganic acids for employment as hardening agents, hydrochloric acid and sulphuric acid have been mentioned, and these acids give a rapid accelerating action; in fact in many instances the acceleration is too fast, for the hardening action begins immediately upon the first contact of the acid on the resin which in turn requires powerful mixing apparatus for rapidly mixing the acid into the mass of resin if every part is to be subjected uniformly and simultaneously to the acid catalyst. Even with the best possible stirring and manipulation of the acid into the resin, blistering, gassing, and entrapped vapors occur in the cured resin composition, rendering these products unsuitable for many commercial applications. When organic acids are substituted for sulphuric or hydrochloric acids, the curing action proceeds more smoothly and with less gassing; but these acids have the disadvantage of causing a very slow cure, and for this reason their use has been limited to applications where slow curing can be tolerated.

It has now been found that sulfamic acid, its derivatives and salts which have an acid type reaction, which can be expressed by the formula $(R'.NH.SO_3)_xR$ wherein $R'$ is hydrogen or a hydrocarbon radical or the radical $NH_4SO_3$— and $R$ is a cation of valence $x$, such as ammonium sulfamate, are soluble in phenol-aldehyde resins and impart to these resins a desirable type and speed of hardening reaction either at room temperature or at elevated temperatures with improved results such as more rapid gelation, better water resistance, and denser and stronger cured resinous compositions than otherwise obtainable. Sulfamic acid is a relatively strong inorganic acid, crystalline in form but non-hygroscopic, odorless, colorless and highly ionized in aqueous solutions. It is reported in the literature that aldehydes react with sulfamic acid to form products which are decomposable in water, acids and alkalies. It is therefore surprising to find that when sulfamic acid, or its acid type derivatives, is used to harden a phenol-formaldehyde resin known to contain a substantial amount of free formaldehyde, a cured product is obtained which is more water resistant than a similar phenol-aldehyde resin cured without the addition of sulfamic acid.

As is well known, phenol-aldehyde resins are manufactured by either the "one-step" or the "two-step" process. In the one-step process, one mol of phenol is customarily reacted with one mol or more of formaldehyde in the presence of acid or alkaline catalysts to produce a heat-reactive type resin. After a resin is formed, the water layer is removed by decantation, and the resin is further dehydrated by distilling off water usually under reduced pressure. Depending upon the ultimate application of the resin, the dehydration is interrupted when there is formed either a resin liquid at room temperature or a brittle resin upon more complete dehydration. The liquid one-step resins are commonly used to produce cast objects by pouring the resin into lead molds and then hardening or polymerizing the resin by the application of moderate heat for 15 to 24 hours; these resins are also used as coatings or bonds for abrasive structures such as sandpaper or grinding wheels, or as the bonding agent in brake lining structures.

Sulfamic acid and its derivatives have been found to be useful hardening agents for the liquid type of resin because controlled hardening rates result which materially reduce the time to heat cure this type of phenol-aldehyde resin. The quantity of sulfamic acid, or its acid derivatives, required to harden varies according to the pH value of the resin; but sufficient acid or acid salts are added to the liquid resin to reduce the pH value to below 6.0 and preferably below 3.0 if the most rapid hardening rate is desired. Practical tests made by adding increasing amounts of sulfamic acid (or its derivatives having an acid reaction) to a liquid phenol-formaldehyde resin and then curing the compositions on a steam hot plate at a temperature of 160° C. have shown that with increasing amounts of the acid, up to 20 to 30 per cent of the weight of the resin, the speed of curing also increases; but with each type of phenol-aldehyde resin there is a point beyond which further addition of acid shows no corresponding increase in rate of curing. With a sufficient quantity (30 per cent) of sulfamic acid liquid one-step phenol-aldehyde resins have been cured to the hard infusible state in less than 10 hours at room temperature.

A convenient method of incorporating sulfamic acid in the brittle phenol-aldehyde resins produced by the "one-step" process is to grind the resin to a fine powder and then thoroughly mix in the powdered resin the required amount of sulfamic acid which has also been finely ground. Since sulfamic acid is non-hygroscopic, it will not react with the dry powdered resin at room temperature; thus these mixtures can be stored for long periods of time without deterioration. But upon the application of sufficient heat to melt the resin, the sulfamic acid will dissolve in the resin and react with it, with the favorable effect of reducing the time to heat cure the resin to the insoluble and infusible state as indicated above in connection with the liquid type of resin.

To produce phenol-aldehyde resins by the two-step process, usually less than a mol of formaldehyde is reacted with a mol of phenol, and after dehydration the resin is in a fusible, brittle, and soluble condition usually described as a novolak resin. To convert these resins to the infusible and insoluble state, additional methylene groups are required by the resin. For this purpose hexamethylenetetramine is commonly the preferred gelling agent; but when used objectionable amounts of free ammonia are liberated during the heat curing of the resin such as to cause porosity in the finished piece unless counter pressure is applied. The addition of sulfamic acids or its acid reactive derivatives, however, so reduces the porosity formation caused by the reaction of the hexamethylenetetramine, that denser and stronger cured pieces are obtained without the necessity of using counter pressure during the heat curing operation.

As little as 1 per cent of sulfamic acid, or a derivative, incorporated in the dry state with a powdered two-step potentially reactive phenol-aldehyde resin, shows that the volatile loss upon curing the resin to the infusible state at elevated temperature is considerably less than with an unmodified resin. In tests made by heating such resins which were modified for instance by the addition of 3 per cent sulfamic acid, there was only a 0.9 per cent volatile loss after heating the resin for 2 hours at a temperature of 160° C.; in this same test it was noticed that no foaming of the sulfamic acid modified resin occurred during the baking shedule, whereas the unmodified resin foamed badly and was porous and brittle. A further confirmation of the denser resin obtainable by modification with sulfamic acid is that tensile tests made on grinding wheels bonded with a sulfamic acid modified resin show approximately 25 per cent higher values than other wheels bonded with resins regularly used in the abrasive industry for bonding.

An improvement resulting from the employment of sulfamic acid in phenol-aldehyde resins generally, is the promotion of a faster initial gelling characteristic upon the application of heat to the resin, thereby imparting quicker rigidity to molded structural shapes and permitting faster molding cycles. In the production of grinding wheels which have a bond composed of phenol-aldehyde resins, the usual practice is to cold mold the wheels and then subject them to a prolonged baking cycle to polymerize and harden the resin bond; but during the baking process when the resin is in a plastic state, support is required by the wheels to prevent them from warping or cracking, and the supporting means are generally beds of sand. When sulfamic acid, or an acid reacting derivative of it, is present in the phenol-aldehyde resin, the faster initial gelation of the resin enables the wheel structure to be self-supporting because of the short time that the resin is in a plastic condition. Moreover, since the addition of sulfamic acid to phenol-aldehyde resins prevents blistering and swelling, particularly in dense abrasive structures subjected to relatively quick curing cycles, a shortening of the normal baking cycle is obtained without sacrificing good bonding properties.

A technical problem arising in a commercial application of phenol-aldehyde resins and solved by incorporating sulfamic acid is, for instance, the manufacture of abrasive coated papers and cloths, in which liquid type one-step phenol-aldehyde resins are used as bonding agents to hold the abrasive particles on the paper; these require a long baking schedule at low temperatures (50°–100° C.) to harden to the infusible state, and, although higher temperatures reduce the curing time, they have an unfavorable action on the paper or textile cloth base which leads to embrittlement and loss of strength. Attempts to use sulphuric or hydrochloric acids to speed up the hardening of the resin at low temperature have not been successful because these acids embrittle or char the cellulose bases as much or more than the high baking temperatures. Organic acids have too little accelerating effect to be practical. But by employing sulfamic acid to harden the phenol-aldehyde resin, a rapid hardening action is obtainable at low temperature without having a deleterious effect on the paper or cloth base.

Another problem has been that of the bonding together of ceramic structures, such as segmental type grinding wheels, which are operated while partly submerged in hot water. Whereas a satisfactorily strong bond under dry conditions has been obtained with unmodified resins, the strength of the resin bond has deteriorated rapidly when immersed in hot water. When a sulfamic acid modified phenol-aldehyde resin was used as the bonding agent, an unexpected increase instead of decrease in strength resulted when the bonded wheel was immersed in boiling water. It has also been found that the wet strength value of a sulfamic acid modified resin can be still further increased when small amounts (between 2 to 15 per cent based on the weight of resin) of a dihydric phenol, such as resorcinol, are added in conjunction with the sulfamic acid; resorcinol can be added as a powder, or it can be dissolved in suitable solvents, water or alcohol, for incorporation in a liquid type resin. Similarly, the sulfamic acid can be added in solution form, but for most purposes it is preferable to incorporate these hardening agents in the dry state in order to reduce the total amount of volatile matter in a resin which must be expelled during the curing of the resin.

In the following examples, there is set out more specifically the optimum employment of sulfamic acid for various commercial uses of phenol-aldehyde resins. In place of sulfamic acid equivalent amounts of its derivatives or salts which have an acid type reaction can be substituted.

*Example 1.*—A liquid one-step type of phenol-formaldehyde resin was prepared with an alkaline catalyst. 76.4 grams of this resin were mixed with 114.4 grams of dry sand and 4 grams of sulfamic acid to form a pasty type cement. The bonding strength of this cement was tested by molding half briquets of the dimensions specified in A. S. T. M. Procedure for Testing Cement (C-77-39), from No. 14 aluminous oxide grain bonded with a ceramic type bond and vitrified at a high temperature; the half briquets were cemented together by spreading a $\frac{1}{16}$ inch coating of the cement on the 1 inch by 1 inch faces of the half briquets and then placing the coated faces together and holding them in this position for 48 hours at room temperature. At the expiration of the 48 hours some of these briquets were tested for tensile strength on a standard Tinius-Olsen tensile testing machine, and the average tensile strength of the resin cement bond was found to be 219 pounds per square inch. The remaining briquets were placed in boiling water for 65 hours and were then removed and tested for tensile strength; the average value was found to be 254 pounds per square inch. The fact that immersion in boiling water improved the tensile strength of the bond was unexpected because the effect of boiling water on organic type bonds as resins is usually that of a pronounced weakening in strength value and in some instances complete disintegration of the bond.

For direct comparison with other acid hardeners, the same resin as employed in the above example was used to make a cement composed of a well stirred mixture of 76.4 grams of liquid resin, 114.4 grams of sand and 9.2 cc. of an alcoholic solution of hydrochloric acid containing equal parts by volume of ethyl alcohol and hydrochloric acid of 35 per cent concentration in water as the acid hardener for the resin. This cement was applied to the faces of half briquets in the same manner as described for the sulfamic acid hardened resin, and after curing for 48 hours at room temperature, some of these briquets were tested for tensile strength, and these showed an average tensile strength of 364 pounds per square inch. The remainder of these briquets were immersed in boiling water for 65 hours, removed and immediately tested for tensile strength and the average value found was 163 pounds per square inch, thereby showing a loss of over 50 per cent in strength from the original dry strength value.

Example 2.—Using the resin of Example 1, a cement composition was prepared by mixing 76.4 grams of the liquid resin with 11.5 grams of a mixture consisting of 66⅔ per cent sulfamic acid and 33⅓ per cent resorcinol, and then adding 114.4 grams of sand. The pasty cement thus formed was coated on the inch square faces of the half briquets prepared as in Example 1; the cement coated faces were pressed together and held in this position for 48 hours at room temperature. The bond of these briquets showed an average tensile strength of 170 pounds per square inch. Immersing some of these briquets after the 48 hour room temperature curing cycle, into boiling water for a period over 65 hours improved the tensile strength of the bond to an average value of 310 pounds per square inch.

Example 3.—For preparing an abrasive paper construction 15 parts by weight of a mixture consisting of 66⅔ per cent by weight of sulfamic acid with 33⅓ per cent by weight of resorcinol, was thoroughly mixed with 100 parts by weight of a one-step phenol-formaldehyde liquid resin and thinly coated on paper with immediate sprinkling on the surface of aluminous oxide granules of No. 50 grain size. The abrasive coated paper was baked for 16 hours at the low temperature of 55° C. and upon cooling the abrasive grains were found to have good adhesion to the paper with the paper still flexible and no indications of embrittlement. Treating a piece of cotton cloth in the same manner gave equally good results. These coated sheets showed excellent resistance to water and gasoline type solvents which is an important requirement of abrasive papers used for wet sanding operations.

Example 4.—A grinding wheel 4 inches by 2¼ inches in size was cold-molded under 5000 pounds per square inch pressure, from a granular mix of 83 parts by weight composed of a mixture of equal parts of Nos. 12, 14 and 16 grain size aluminous oxide granules, which were wetted by 3 parts by weight of a liquid type one-step phenol-formaldehyde resin and then mixed with 14 parts by weight of a mixture consisting of 43 per cent by weight of cryolite and 57 per cent of a phenol-formaldehyde novolak resin containing 10 per cent by weight of hexamethylenetetramine and 4.4 per cent by weight of sulfamic acid. The cold molded grinding wheel was placed unsupported in an oven the temperature of which was maintained at 85° C. for 16 hours and then gradually increased to 177° C. in 8 hours, and the temperature held for 16 hours. At the end of this baking cycle (which is severe for such thick dense structures) the grinding wheel was removed from the oven, allowed to cool to room temperature. It was found to have held its shape perfectly, showing no signs of swelling, blistering or cracks which would normally occur in grinding wheels bonded with unmodified phenol-aldehyde resins subjected to the same rapid temperature rise during the curing operation.

Example 5.—Two series of standard figure 8 shaped briquets for testing were cold molded and baked using in one group a commercial unmodified phenol-aldehyde resin regularly used in bonding abrasive structures, and in the other group the same resin but modified by the addition of sulfamic acid. The procedure of preparing the briquets of the former group was to first wet 528 grams of No. 14 grain size of aluminous oxide grit with 18 grams of a liquid one-step type of phenol-aldehyde resin; then 54 grams of the finely powdered two-step type of a fusible phenol-formaldehyde resin containing 10 per cent by weight of hexamethylenetetramine were well mixed with the coated abrasive grains; the mixture was cold pressed using about 3000 pounds pressure per square inch, and the cold pressed briquets were then baked in an oven at 52° C. for 16 hours, gradually increased during the next 9 hours to 182° C. and held there for an additional 7 hours, after which the baked briquets were removed and cooled before testing. The foregoing procedure was also followed with the sulfamic acid modification of the powdered two-step resin by using 54 grams of a mixture composed of 100 parts by weight of the powdered two-step resin, 7 parts by weight of hexamethylenetetramine and 5 parts by weight of sulfamic acid. The briquets molded with the standard two-step resin showed an average tensile strength of 1200 pounds per square inch, whereas the sulfamic acid modified resin bonded briquets showed an average tensile strength of 1500 pounds per square inch.

What is claimed is:

1. Composition comprising a resinous reaction product in hardenable form obtained from a phenol and an aldehyde as the sole reactants and a minor proportion of an agent for accelerating the hardening thereof comprising a compound having an acid type reaction and of the formula $(R'.NH.SO_3)_xR$ wherein $R'$ represents a member of the group consisting of hydrogen, hydrocarbon radicals and $NH_4SO_3-$, R is a cation of valence $x$ and $x$ is a whole number.

2. Composition comprising a resinous reaction product in hardenable form obtained from a phenol and an aldehyde as the sole reactants and an agent for accelerating the hardening thereof comprising sulfamic acid in amount up to thirty per cent by weight of the reaction product.

3. Composition comprising a resinous reaction product in hardenable form obtained from a phenol and an aldehyde as the sole reactants and an agent for accelerating the hardening comprising sulfamic acid in amount to cause hardening at room temperature.

4. Composition comprising a resinous reaction product in hardenable form obtained from a phenol and an aldehyde as the sole reactants and an agent for accelerating the hardening thereof comprising sulfamic acid and dihydric phenol.

5. Composition comprising a resinous reaction product in hardenable form obtained from a phenol and an aldehyde as the sole reactants and an agent for accelerating the hardening thereof comprising sulfamic acid up to thirty per cent by weight of the product and a dihydric phenol up to fifteen per cent by weight of the product.

6. Composition comprising a resinous reaction product in hardenable form obtained from a phenol and an aldehyde as the sole reactants and an agent for accelerating the hardening thereof comprising sulfamic acid and resorcinol.

7. Composition comprising a novolak resinous reaction product obtained from a phenol and an aldehyde as the sole reactants, a hardening agent in amount to render the product hardenable and an agent for accelerating the hardening of the product comprising sulfamic acid.

8. Process of controlling the hardening of a resinous reaction product in hardenable form obtained from a phenol and an aldehyde as the sole reactants which comprises incorporating in the product an agent for accelerating the hardening thereof comprising a compound having an acid type reaction and of the formula $(R'.NH.SO_3)_xR$, wherein $R'$ represents a member of the group consisting of hydrogen, hydrocarbon radicals and $NH_4SO_3-$, R is a cation of valence $x$ and $x$ is a whole number.

9. Process of controlling the hardening of a novolak resinous reaction produce obtained from a phenol and an aldehyde as the sole reactants which comprises adding to the product in dry form a hardener and an agent for accelerating the hardening, said agent comprising sulfamic acid, and heating the mixture to cause fusion and hardening of the product.

RUPERT S. DANIELS.